(12) United States Patent
Yoshioka

(10) Patent No.: US 6,183,387 B1
(45) Date of Patent: Feb. 6, 2001

(54) VARIABLE PRESSURE RELIEF SYSTEM FOR HYDRAULICALLY ACTUATED LIMITED SLIP DIFFERENTIALS

(75) Inventor: Jun Yoshioka, Fort Wayne, IN (US)

(73) Assignee: Dana Corporation, Toledo, OH (US)

( * ) Notice: Under 35 U.S.C. 154(b), the term of this patent shall be extended for 0 days.

(21) Appl. No.: 09/320,414

(22) Filed: May 26, 1999

(51) Int. Cl.$^7$ .................................................. F16H 48/00
(52) U.S. Cl. ............................ 475/88; 475/89; 475/90
(58) Field of Search ........................................ 475/88–92

(56) References Cited

U.S. PATENT DOCUMENTS

| | | |
|---|---|---|
| 3,974,717 | 8/1976 | Breed et al. . |
| 4,070,924 * | 1/1978 | Moreno et al. .................. 475/89 X |
| 4,679,463 | 7/1987 | Ozaki et al. . |
| 4,732,052 * | 3/1988 | Dewald .................................. 475/90 |
| 5,024,634 | 6/1991 | Blessing . |
| 5,161,636 | 11/1992 | Haupt et al. . |
| 5,194,053 * | 3/1993 | Sano et al. ............................ 475/89 |
| 5,601,508 * | 2/1997 | Kuzevanov ...................... 475/89 X |
| 5,938,556 * | 8/1999 | Lowell ................................... 475/89 |
| 5,964,126 * | 10/1999 | Okcuoglu .............................. 74/650 |
| 5,967,285 * | 10/1999 | Mohan et al. .................... 192/103 F |
| 6,000,513 * | 10/1999 | Richards ................................ 192/61 |
| 6,001,040 * | 12/1999 | Engle .................................... 475/88 |
| 6,076,646 * | 6/2000 | Burns .............................. 182/85 AA |

* cited by examiner

Primary Examiner—Khoi Q. Ta
(74) Attorney, Agent, or Firm—Oldham & Oldham Co., L.P.A.

(57) ABSTRACT

The present invention relates generally to hydraulically actuated limited slip differentials. More particularly, the present invention relates to a hydraulic limited slip differential which utilizes a variable pressure relief check valve used to vary the maximum hydraulic pressure available within the differential case in a manner that the limited slip feature can be adjusted anywhere between a full "ON" and a full "OFF" configuration. Hydraulic fluid will not flow through the check valve until the hydraulic pressure within the case results in a reaction force larger than the check valve activation pressure, thus providing a maximum pressure limit in the hydraulic system. The activation pressure of the check valve can be selectively controlled by an actuator. The movement of the actuator corresponds to a change the retaining force of the check valve. Dynamic control of the system in response to vehicle operational parameters may also be performed.

21 Claims, 2 Drawing Sheets

VARIABLE PRESSURE RELIEF SYSTEM FOR HYDRAULICALLY ACTUATED LIMITED SLIP DIFFERENTIALS

TECHNICAL FIELD

The present invention relates generally to hydraulically actuated limited slip differentials. More particularly, the present invention relates to an externally actuated variable pressure relief system for hydraulically actuated limited slip differentials.

BACKGROUND OF THE INVENTION

Early differential mechanisms consisted of a set of planetary gears coupled between two half-shafts of a drive axle. Such a drive axle has the advantages over a solid axle that the wheels of the vehicle can travel at different speeds and equal driving force can be applied to the driving wheels. However, under certain driving conditions, this conventional differential has a serious deficiency. For example, if a drive wheel is on a slippery surface, such as ice or mud, that wheel will slip and spin, and will not provide significant driving torque to move the vehicle. The other drive wheel, which well may be on a surface that the tire will not slip, can apply no more driving torque than the spinning wheel because the differential delivers only an equal amount of torque to both wheels. Thus, the total driving force can never be more than twice the amount applied by the wheel with the poorest road adhesion.

Traction is also adversely effected, especially during hard driving, by other conditions that unbalance the weight on the driving wheels. When driving at high speed around a curve, the weight is transferred from the inside wheel to the outside wheel. Hard acceleration coming out of a turn can then cause the inside wheel to spin because it has less weight on it and therefore less road adhesion. Similarly, during any quick acceleration there is propeller shaft reaction torque on the rear axle assembly. When one wheel is partially unloaded and loses part of its traction capability, the loss is not offset by gain on the opposite side because the total can only be twice that of the wheel with the lesser capability.

The limited slip differential was designed to improve the traction of a vehicle under adverse traction conditions by allowing the differential to transmit torque to the axle shafts in unequal amounts without interfering with the differential action on turns. The most common limited slip differential is the friction type which has clutch assemblies mounted between the two side gears and the differential case. In a conventional differential, the side gears and the axle shafts to which they are splined always turn freely in the case. The added clutches provide a means of transferring torque from the faster spinning (usually slipping) wheel to the slower spinning (usually better traction) wheel.

Typically, there are one or two clutch packs comprised of disks that are splined to the side gear, and plates that are tanged to fit into the differential case. Thus, the disks rotate with the side gear and the plates rotate with the case. These clutches are often designed to be applied or actuated by hydraulic pressure. This pressure may be regulated as necessary to adjust the differential from zero to full locking as driving needs dictate.

Recent advances in vehicle control may require the disabling of the limited slip feature of the differential at moderate to high speeds. One such system is the yaw stability control which uses the vehicle's brakes to correct the trajectory of the vehicle during a turn. The impulse braking of the yaw stability control feature generates a speed difference between the wheels on either side of the vehicle. The limited slip feature will engage due to this speed difference and may interfere with the performance of the yaw stability control feature. There is therefore a need to disable the limited slip feature of the hydraulic limited slip differential during specified conditions to ensure proper performance of the devices like yaw stability control while also allowing the limited slip feature to be enabled at other specified conditions where traction may be needed and where yaw control is not essential. There is a problem with current hydraulically actuated limited slip differentials in that they do not have a simple on/off capability which is separate and distinct from the hydraulic pressure supply/control circuit actuating the clutch assemblies.

In addition, most hydraulically actuated limited slip differentials employ a passive hydraulic pressure control often in the form of a blow-by seal which releases hydraulic fluid in order to stabilize the pressure at a fixed maximum pressure limit. There currently is no active hydraulic pressure control system which is separate from the hydraulic pressure supply/control circuit which has the ability to regulate the hydraulic pressure between a minimum and a maximum limiting pressure.

It is the intent of this invention to overcome these shortcomings by providing an external control of the hydraulic pressure generated within a hydraulically actuated limited slip differential in which the limited slip clutch can either be turned on or off, or set at any intermediate condition by controlling the maximum system hydraulic pressure limit.

SUMMARY OF THE INVENTION

The present invention concerns a hydraulic limited slip differential utilizing a variable pressure relief check valve to vary the maximum hydraulic pressure available within the differential case in a manner that the limited slip feature can be adjusted anywhere between a full "ON" and a full "OFF" configuration. In the hydraulic limited slip differential of the present invention, the wall of the differential case has a check valve. Hydraulic fluid will not flow through the check valve until the hydraulic pressure within the case results in a reaction force larger than the check valve activation pressure, thus providing a maximum pressure limit in the hydraulic system. The activation pressure of the check valve can be selectively controlled by an actuator ring. The actuator ring preferably is moveable laterally relative to the case. The movement of the actuator ring results in a change of the retaining force of the check valve. When the actuator ring is forced against the case, the retaining force of the check valve is at its maximum. At this configuration, the maximum pressure attainable within the case is sufficient to fully actuate the hydraulic clutch which results in the limited slip feature of the hydraulic limited slip differential. When the actuator ring is forced away from the case, the retaining force of the check valve is reduced, as is the maximum pressure attainable within the case. At the furthest point of travel of the actuator ring, the retaining force of the check valve is at its minimum. At this configuration, the maximum pressure attainable within the case is not sufficient to actuate the hydraulic clutch which results in disabling the limited slip feature of the differential. At any point between the extreme travel points of the actuator ring, different maximum pressures are attainable within the case which will allow partial activation of the hydraulic clutch and thus of the limited slip feature.

The maximum pressure attainable within the case can be adjusted by externally controlling the lateral position of the actuator ring with a linear actuator/shift mechanism. The actuator/shift mechanism can be combined with electronic sensing of a one or more vehicle operation parameters, and a programmable control mechanism could be used to interface with the hydraulic actuated limited slip differential. This would permit the locking torque of the differential to be varied as necessary to meet driving requirements.

Other advantages and novel features of the present invention will become apparent in the following detailed description of the invention when considered in conjunction with the accompanying drawings.

DETAILED DESCRIPTION OF THE DRAWINGS

Figure 1:
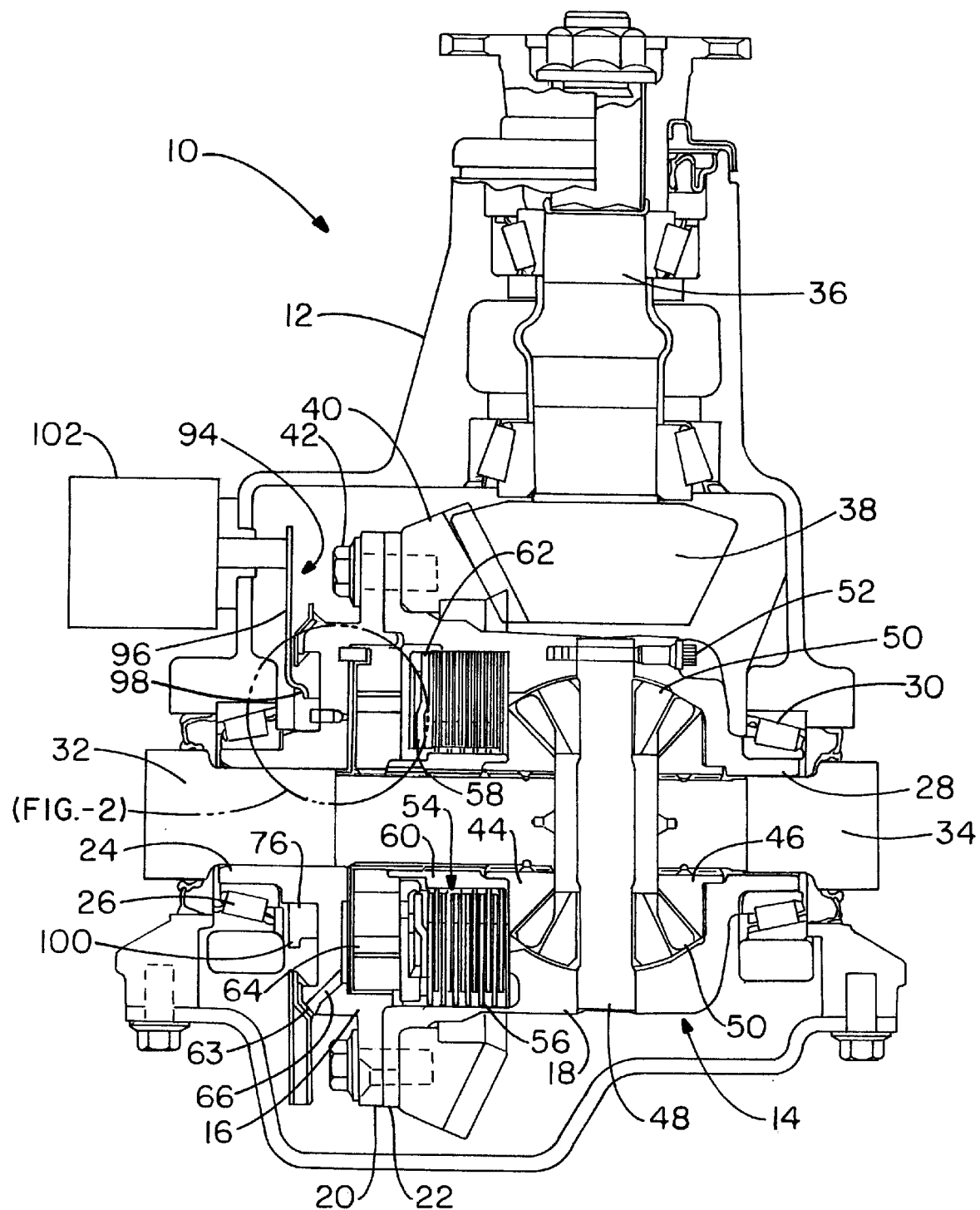
FIG. 1 is a cross-sectional view of a hydraulic limited slip differential gear apparatus of the present invention.

In the following detailed description of preferred embodiments of the present invention, reference is made to the accompanying drawings which, in conjunction with this detailed description, illustrate and describe a vehicle hydraulic limited slip differential gear apparatus 10 incorporating a variable pressure relief system 11 in accordance with the present invention. Referring now to the drawings, in which like-referenced characters indicate corresponding elements throughout the several views, attention is first directed to FIG. 1, wherein the apparatus 10 includes an outer housing 12 enclosing a rotatable differential gear case 14. The case 14 may be formed from a left half case 16 and a right half case 18 coupled at radially outwardly extending flanges 20 and 22 respectively, or another suitable configuration. The left half case 16 has an axially outwardly extending hub 24 formed thereon which is rotatably retained by a tapered roller bearing 26 mounted on the interior of the outer housing 12. Similarly, the right half case 18 has an outwardly axially extending hub 28 which is rotatably retained by a tapered roller bearing 30 mounted on the interior of the housing 12. The bearings 26 and 30 are mounted on opposite sides of the housing 12 concentrically with a pair of openings through which the inner ends of a left half axle 32 and right half axle 34 respectively extend.

An end of a drive shaft 36 extends through a front wall of the outer housing 12 and terminates in a drive pinion gear 38. A ring gear 40 is mounted on the outer surface of the right half case 18 and abuts the flange 22. The case halves 16 and 18 are attached together and to the ring gear 38 by a plurality of threaded fasteners 42 which pass through apertures formed in the flanges 20 and 22 and threadably engage threaded apertures in the ring gear 40.

The left half axle 32 and right half axle 34 are connected by splines to a left side gear 44 and a right side gear 46, respectively. The left side gear 44 and right side gear are separated by a pinion shaft 48 with a pinion gear 50 at either end such that the pinion gears 50 mesh with the side gears 32, 34. The pinion shaft 48 is attached to the right half case 18 by a threaded fastener 52 such that the pinion shaft 48 rotates with the differential gear case 14.

A hydraulically operated multi-disk wet clutch assembly 54 is positioned inside the right half case 18. The clutch assembly 54 provides a controllable and variable resistance to the relative rotation between the left half axle 32 and the right half axle 34. The clutch assembly 54 includes a wet clutch pack comprised of a plurality of laterally movable annular clutch disks concentrically stacked together side by side. Alternate disks 56 are slidably keyed to the right half case 18 and are linked to the right half axle 34 through the right half case 18, the pinion shaft 48, pinions 50, and left half axle 32. The alternate disks 56 alternate with a plurality of intermediate disks 58 which are slidably keyed by means of radially inwardly projecting teeth which engage the teeth formed on a torque hub 60 which is connected to the left half axle 32 by splines.

The left end of the clutch pack of the clutch assembly 54 abuts an annular pressure plate 62. The right end of the clutch assembly abuts an interior wall of the right half case 18. The pressure plate 62 is moved axially by a piston mechanism 64 which is connected to the left half axle 32 by splines. The piston mechanism 64 is free to move axially to apply pressure to the wet clutch pack tending to force it against the interior wall of the right half case 18.

The left half case 16 has a fluid passageway 66 formed therein which is connected to a rotor pump (not shown). The rotor pump is automatically activated by differentiation of the between the left half axle 32 and the right half axle 34. As the differentiation increases, the rotor pump increases the hydraulic pressure and forces the piston mechanism 64 to actuate. As the piston mechanism 64 is actuated by the application of hydraulic fluid pressure, the clutch disks 54 are squeezed together between the pressure plate and the right half case 18 thereby providing resistance to relative rotation between the left half axle 32 and the right half axle 34.

Figures 2, 3:
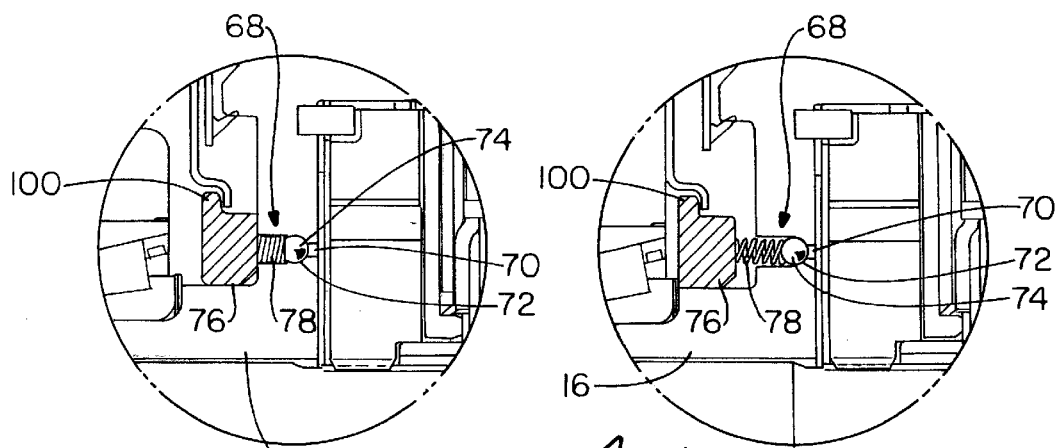
FIG. 2 is a partial cross-sectional side view of a variable pressure relief system at the highest maximum pressure limit configuration in accordance with the present invention, and showing the circled area of FIG. 1 in more detail.
FIG. 3 is a partial cross-sectional side view of a variable pressure relief system at the lowest maximum pressure limit in accordance with the present invention, and showing the circled area of FIG. 1 in more detail.
Figure 4:
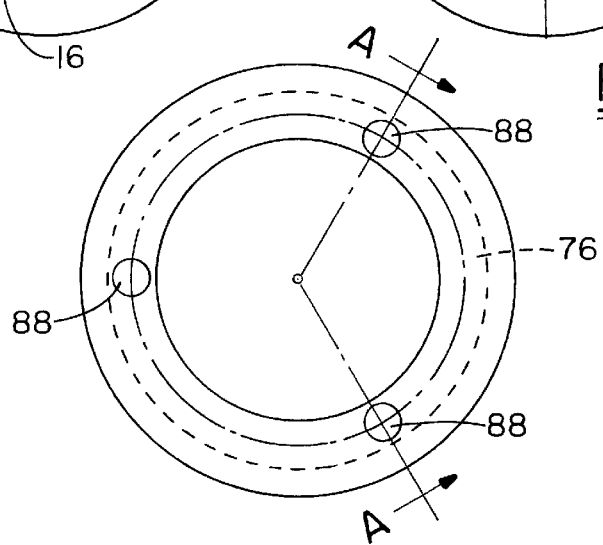
FIG. 4 is a top view of the annular actuator ring.
Figures 5, 6A, 6B:
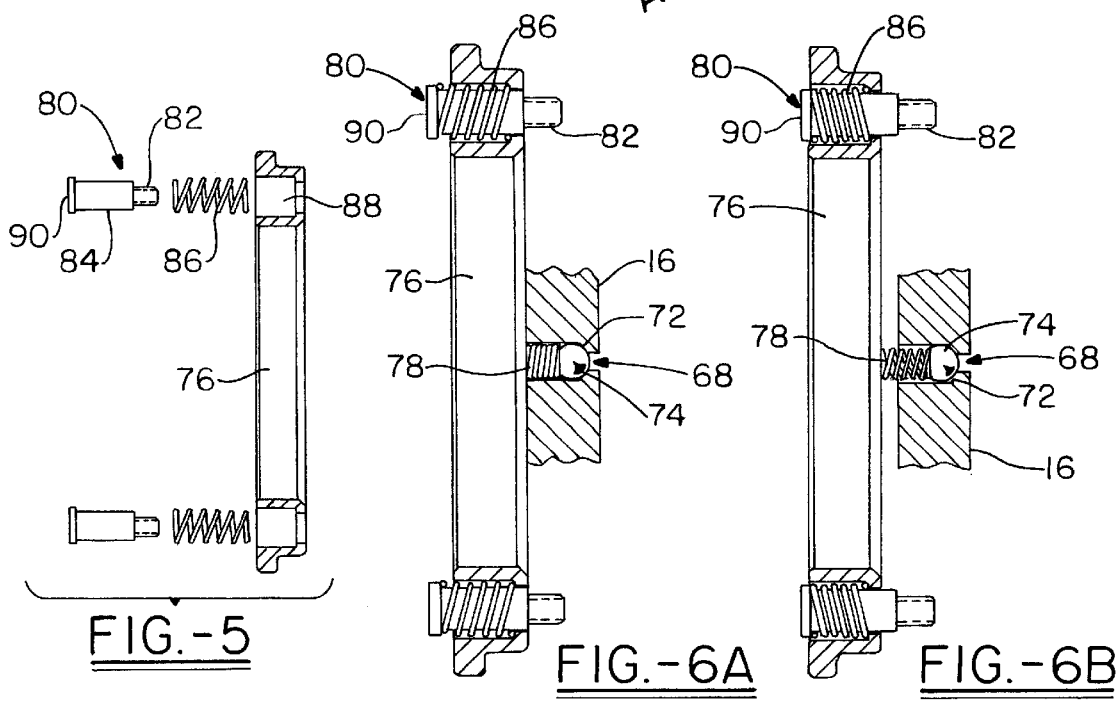
FIG. 5 is a cross-sectional view of the annular actuator ring of FIG. 4 taken along line A—A illustrating the assembly of the fasteners and springs within the actuator ring.
FIGS. 6A–6B are cross-sectional views of the check valve and actuator ring illustrating the actuated and non-actuated positions of the actuator ring.

Referring now to FIG. 2, the variable pressure relief system 11 is described. The wall of the left half case 16 has a check valve 68 which comprises a fluid passage hole 70 and a seal surface 72 sealed by a ball 74. The ball 74 is held in place by an annular actuator ring 76 which pushes against a check valve spring 78 located within the fluid passage hole 70, forcing the ball 74 against the seal surface 72 of the fluid passage hole 70. As best shown in FIGS. 5 and 6, the annular actuator ring 76 is attached to the left half case 16 by a plurality of threaded fasteners 80 in a manner allowing lateral movement of the annular actuator ring 76 away from the left half case 16. The fasteners 80 comprise a threaded portion 82 which attaches to the left half case 16, a cylindrical body portion 84 which fits within the inner diameter of a biasing spring 86 placed within a cylindrical spring housing 88 formed in the annular actuator ring 76, and a head portion 90 of a larger diameter than the spring 86 such that a spring 86 biases the annular actuator ring 76 against the left half case 16.

As best shown in FIG. 2 and FIG. 6A, when the annular actuator ring 76 is positioned against the left half case 16, the check valve spring 78 is highly compressed resulting in a high spring force. Hydraulic fluid will not flow through the check valve 68 until the hydraulic pressure results in a reaction force larger than the spring force from the check valve spring 78, thereby pushing the ball 74 out of its seal surface 72 seat. This configuration provides a maximum pressure limit in the hydraulic system. When the annular actuator ring 76 is positioned against the case 16, the retaining force of the check valve 68 is at its maximum. In this configuration, the maximum pressure attainable within the case 14 is sufficient to fully actuate the hydraulic clutch assembly 54 which results in providing the limited slip function in the differential 10, and the limited slip feature is in the fully "ON" condition.

Referring now back to FIG. 1, the pressure limit of the check valve 68 can be adjusted by externally controlling the lateral position of the annular actuator ring 76. The annular actuator ring 76 rotates with the differential case 14. A fork shift mechanism 94 comprises an arm 96 with an arm end 98 adapted and formed to mate with an annular lip extension 100 on the outer diameter of the annular actuator ring 76. Preferably, the fork shift mechanism 94 is moved laterally by a linear actuator 102 which is housed outside the differential housing 12. The fork shift mechanism 94 is used to move the annular actuator ring 76 laterally away from the left half case 16 by pulling on the annular lip extension 100 on the outer diameter of the annular actuator ring 76. As the annular actuator ring 76 is moved away from its normal position against the left half case 16, the check valve spring 78 becomes less compressed, thereby requiring less pressure to unseat the ball 74. This results in an adjustment mechanism for lowering the maximum system pressure attainable within the case 14. It should be recognized that other methods of adjusting the position of actuator ring 76 could be used and are contemplated within the invention.

As best shown in FIG. 3 and FIG. 6B, when the annular actuator ring 76 is moved to its furthest limit away from the left half case 16 (when the springs 86 are fully compressed), the check valve spring 78 is at its least compressed condition resulting in a lower spring force. At this configuration, the limited slip feature is in the fully "OFF" condition in that the check valve spring force is low enough that the maximum pressure which can be obtained in the differential case 14 is not high enough to engage clutch assembly 54, essentially disabling the limited slip feature of the hydraulic limited slip differential 10 without affecting the differential capability.

In between the "ON" and "OFF" conditions shown in FIGS. 2 and 3, the ring 76 can be moved to any location between these limits. This provides the hydraulic limited slip differential 10 with a variable maximum system pressure limit in which the amount of the limited slip available to the system can be limited and optimized to match various vehicle operating conditions. This provides an opportunity to dynamically control the hydraulic pressure for traction enhancement. For example, if the hydraulic differential system pressure is set at a low value, a control system can be used to sense wheel RPM or speed differences and allow for increased hydraulic pressure. The increase in pressure available may be a function of the speed difference. This will result in an optimized amount of limited slip between the fully "ON" and "OFF" conditions.

The annular actuator ring 76 can be rotating while the fork shift mechanism 94 is moving laterally thus allowing for dynamic changes of hydraulic pressure of the limited slip differential when the parts are rotating or when the vehicle is moving. Although shown in FIG. 1 as controlled by a linear actuator 96, it is contemplated that the fork shift mechanism 94 can be externally controlled by different mechanisms such as manual activation by means of cables, rods, hydraulics, compressed air, electronic solenoids, ball screws, electric motors, linear motors, etc. The fork shift actuation mechanism can be housed inside or outside the differential housing 12.

In an alternate embodiment of the invention, the actuation of the fork shift mechanism 94 can be combined with electronic sensing and monitoring of one or more vehicle parameters, and a programmable control mechanism could be used to interface with the hydraulic actuated limited slip differential. For example, the yaw stability control actuation may be actuated when the vehicle speed reaches a predetermined level. At this same speed, the fork shift mechanism 94 will be actuated to disengage the limited slip feature of the differential 10. When the vehicle speed falls below the predetermined level, the limited slip feature can be turned back "ON". Another vehicle parameter which could be effectively used in this manner is the steering angle. This could be sensed to determine if the yaw stability control feature is needed. At ranges from small to no steering angle the limited slip feature can be made available and then disengaged at larger steering angles. Either of these methods could also be combined with the previously mentioned method of optimizing the amount of limited slip available between an "ON" and "OFF" position by monitoring differences in wheel RPM or speed.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A hydraulic vehicle differential apparatus for driving a pair of vehicle half axles from a drive shaft, comprising:
   an outer housing;
   a differential gear assembly in a case rotatably mounted in said housing and adapted to be coupled between a vehicle drive shaft and a pair of drive axles;
   a limited slip assembly comprising a hydraulic actuator coupled between said case and one of said drive axles for selectively resisting relative rotation between said drive axles; and
   a variable pressure relief system to selectively control said limited slip assembly.

2. The hydraulic vehicle differential apparatus of claim 1, wherein said variable pressure relief system can selectively control said limited slip assembly externally from said outer housing.

3. The hydraulic vehicle differential apparatus of claim 1, wherein said variable pressure relief system is adapted to selectively set a maximum hydraulic pressure attainable within said case between a maximum and a minimum release pressure.

4. The hydraulic vehicle differential apparatus of claim 3, wherein said variable pressure relief system includes an actuator ring which is selectively positionable and wherein the position of said actuator ring sets said maximum pressure attainable within said case between said maximum and said minimum release pressure.

5. The hydraulic vehicle differential apparatus of claim 3, wherein said minimum release pressure is at a level which prevents actuation of said clutch assembly.

6. The hydraulic vehicle differential apparatus of claim 3, wherein said maximum release pressure is at a level which enables complete actuation of said clutch assembly.

7. The hydraulic vehicle differential apparatus of claim 3, wherein said maximum hydraulic pressure attainable within said case is adjustable between said minimum release pressure and said maximum release pressure which enables partial actuation of said clutch assembly.

8. The hydraulic vehicle differential apparatus of claim 1, wherein said selective control of said limited slip assembly is set and reset dynamically while said differential case is rotating.

9. The hydraulic vehicle differential apparatus of claim 1, wherein said selective control of said limited slip assembly is determined in response to at least one vehicle parameter.

10. The hydraulic vehicle differential apparatus of claim 8, wherein said at least one vehicle parameter is selected from the group consisting of vehicle speed, wheel speed difference, steering angle, brake application, ice detection, moisture detection, and yaw stability control system actuation.

11. A method of controlling the limited slip function of a limited slip differential comprising the steps of:

providing a variable pressure relief system in association with a hydraulically actuated clutch assembly associated with a limited slip differential; and selectively actuating said variable pressure relief system to vary the maximum hydraulic pressure attainable in operating said clutch assembly to control said limited slip function of said differential.

12. The method of claim 11, wherein said step of selectively actuating said variable pressure relief system includes adjustment of an actuator between a fully engaged position and a fully disengaged position to set a maximum hydraulic pressure attainable within the differential.

13. The method of claim 12, wherein said actuator is selectively positioned to set said maximum hydraulic pressure attainable within said differential.

14. The method of claim 11 further comprising the steps of:

sensing a vehicle parameter; and controlling said limited slip function of said differential in response to feedback from said sensed vehicle parameter.

15. The method of claim 14, wherein said sensed vehicle parameter is selected from the group consisting of vehicle speed, wheel speed difference, steering angle, brake application, ice detection, moisture detection, and yaw stability control system actuation.

16. The method of claim 12, wherein said fully engaged position of said actuator corresponds to a maximum release pressure of said variable pressure relief system and wherein said fully disengaged position of said actuator corresponds to a minimum release pressure of said variable pressure relief system.

17. The method of claim 16, wherein said minimum release pressure is at a level which prevents actuation of said clutch assembly.

18. The method of claim 16, wherein said maximum release pressure is at a level which enables complete actuation of said clutch assembly.

19. The method of claim 16, wherein said maximum hydraulic pressure attainable within the differential is adjustable between said minimum release pressure and said maximum release pressure which enables partial actuation of said clutch assembly.

20. The method of claim 12, wherein said adjustment of said actuator is set and reset dynamically while said differential case is rotating.

21. The method of claim 11, wherein said variable pressure relief system can be selectively set externally from said outer housing.

* * * * *